United States Patent [19]

Lausberg et al.

[11] Patent Number: 4,968,731
[45] Date of Patent: Nov. 6, 1990

[54] GLASS FIBER REINFORCED THERMOPLASTIC MOLDING COMPOSITIONS BASED ON POLYESTERS AND GRAFT POLYMERS

[75] Inventors: Dietrich Lausberg; Erhard Seiler, both of Ludwigshafen; Walter Heckmann, Weinheim; Manfred Knoll, Wachenheim, all of Fed. Rep. of Germany

[73] Assignee: BASF Aktiengesellschaft, Ludwigshafen, Fed. Rep. of Germany

[21] Appl. No.: 255,027

[22] Filed: Oct. 7, 1988

[30] Foreign Application Priority Data

Oct. 7, 1987 [DE] Fed. Rep. of Germany ....... 3733838

[51] Int. Cl.$^5$ ................................................ C08K 3/40
[52] U.S. Cl. ..................................... 523/436; 523/522; 523/527; 524/504; 525/64
[58] Field of Search .................. 523/436, 522; 525/64; 524/504

[56] References Cited

U.S. PATENT DOCUMENTS

| 4,022,748 | 5/1977 | Schlichting et al. ................. 525/64 |
| 4,148,958 | 4/1978 | Breitenfellner et al. . | |
| 4,224,419 | 9/1980 | Swoboda et al. ..................... 525/71 |
| 4,404,161 | 9/1983 | Bier ...................................... 525/64 |
| 4,442,262 | 4/1984 | Yusa et al. ............................ 525/64 |
| 4,564,653 | 1/1986 | Kamata et al. ....................... 525/64 |
| 4,605,699 | 8/1986 | Mitulla et al. ........................ 525/71 |
| 4,607,075 | 8/1986 | Baum et al. .......................... 525/64 |
| 4,804,708 | 2/1989 | Wittmann et al. ................... 525/64 |

FOREIGN PATENT DOCUMENTS

| 29931 | 6/1981 | European Pat. Off. ............. 525/64 |
| 187650 | 7/1986 | European Pat. Off. ............. 525/64 |
| 3328568 | 2/1985 | Fed. Rep. of Germany ........ 525/64 |
| 30753 | 2/1982 | Japan .................................... 525/64 |
| 1124911 | 8/1968 | United Kingdom . |
| 2040958 | 9/1980 | United Kingdom . |

Primary Examiner—John C. Bleutge
Assistant Examiner—David W. Woodward
Attorney, Agent, or Firm—Oblon, Spivak, McClelland, Maier & Neustadt

[57] ABSTRACT

Thermoplastic molding compositions based on thermoplastic polyesters ($a_1$), graft polymers incorporating acrylate rubbers as grafting base ($a_2$) and a two-shell graft sheath, copolymers of aromatic vinyl monomers and acrylonitrile or methacrylonitrile ($a_3$) and glass fibers (B) have a balanced range of properties.

1 Claim, No Drawings

GLASS FIBER REINFORCED THERMOPLASTIC MOLDING COMPOSITIONS BASED ON POLYESTERS AND GRAFT POLYMERS

The present invention relates to thermoplastic molding compositions containing as essential components (A) from 45 to 90% by weight of a mixture of
- ($a_1$) from 50 to 80% by weight of a polyester
- ($a_2$) from 10 to 25% by weight of a graft polymer built up from
  - ($a_{21}$) from 50 to 90% by weight of a grafting base comprising an elastomeric polymer based on
    - ($a_{211}$) from 95 to 99.9% by weight of a $C_2$–$C_{10}$-alkyl acrylate and
    - ($a_{212}$) from 0.1 to 5% by weight of a polyfunctional monomer having at least two olefinic, nonconjugated double bonds
  - ($a_{22}$) from 10 to 50% by weight of a graft surface comprising
    - ($a_{221}$) from 5 to 50% by weight of a first sheath of styrene or substituted styrene of the general formula I

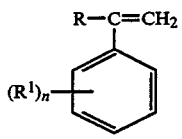

$$R-C=CH_2 \quad (I)$$
$$(R^1)_n$$

where R is alkyl of from 1 to 8 carbon atoms, hydrogen or halogen, $R^1$ is alkyl of from 1 to 8 carbon atoms or halogen and n is 0, 1, 2 or 3, or a mixture thereof, and
- ($a_{222}$) from 50 to 95% by weight of a second graft sheath of
  - ($a_{2221}$) from 80 to 100% by weight of methacrylic acid or an ester thereof whose polymer would, in the absence of ($a_{21}$) have a glass transition temperature of more than 40° C. and
  - ($a_{2222}$) from 0 to 20% by weight of further comonomers
- ($a_3$) from 10 to 25% by weight of a copolymer of
- ($a_{31}$) from 50 to 90% by weight of styrene or substituted styrene of the general formula I or a mixture thereof and
- ($a_{32}$) from 10 to 50% by weight of acrylonitrile or methacrylonitrile or a mixture thereof, and
- ($a_{33}$) from 0 to 10% by weight of a monomer having carboxyl, carboxyl derivative, hydroxyl or epoxy groups and (B) from 5 to 50% by weight of glass fibers.

The present invention also relates to the use of such molding compositions for producing moldings and the moldings obtainable from the molding compositions according to the invention as essential components.

DE-B-No. 2,758,497 describes thermoplastic molding compositions based on polyesters and modified styrene/acrylonitrile (SAN) copolymers using as modifying agents acrylic esters and/or α-methylstyrene. In the examples, ASA polymers are used as modified SAN polymers. If the modified SAN polymer is the main component in these compositions, films are producible therefrom with advantage. The mechanical properties, however, are still not fully satisfactory as a whole, in particular as regards the impact resistance and bending strength. Nor is the stability of the properties on prolonged storage at elevated temperatures satisfactory.

It is an object of the present invention to provide thermoplastic molding compositions based on polyesters and graft polymers free of the above-described disadvantages. More particularly, they are to have a satisfactory long-term stability in respect of the mechanical properties at elevated temperatures.

We have found that this object is achieved by means of the thermoplastic molding compositions defined at the beginning.

As component A, the molding compositions according to the invention contain from 45 to 90, in particular from 55 to 90, particularly preferably from 60 to 85%, by weight of a mixture of
- ($a_1$) from 50 to 80% by weight of a polyester
- ($a_2$) from 10 to 25% by weight of a graft polymer and
- ($a_3$) from 10 to 25% by weight of a styrene/(meth)acrylonitrile copolymer.

The polyesters ($a_1$) contained in the molding compositions according to the invention are known per se. Preference is given to using polyesters which contain an aromatic ring in the main chain. The aromatic ring may also be substituted, for example by halogens, such as chlorine and bromine, and/or by $C_1$–$C_4$-alkyl groups, for example methyl, ethyl, i- or n-propyl and i-, n- or t-butyl.

The polyesters may be prepared by reacting dicarboxylic acids, esters thereof or other ester-forming derivatives thereof with dihydroxy compounds in a conventional manner.

Suitable dicarboxylic acids are for example aliphatic and aromatic dicarboxylic acids, which may also be used mixed. Examples thereof are naphthalenedicarboxylic acids, terephthalic acid, isophthalic acid, adipic acid, azelaic acid, sebacic acid, dodecanedioic acid and cyclohexanedicarboxylic acids, mixtures of these carboxylic acids and ester-forming derivatives thereof.

The dihydroxy compounds used are preferably diols of from 2 to 6 carbon atoms, particularly preferably ethylene glycol, 1,4-dibutanediol, 1,4-butenediol and 1,6-hexanediol; but it is also possible to use 1,4-hexanediol, 1,4-cyclohexanediol, 1,4-di(hydroxymethyl)cyclohexane, bisphenol A, neopentylglycol, mixtures of these diols and ester-forming derivatives thereof.

Polyesters of terephthalic acid and a $C_2$–$C_6$-diol component, e.g. polyethylene terephthalate or polybutylene terephthalate or mixtures thereof, are particularly preferred.

The relative viscosity $n_{spec}/c$ of the polyesters, measured in 0.5% strength by weight solution in a phenol/o-dichlorobenzene mixture (weight ratio 3:2) at 25° C., is in general within the range from 1.2 to 1.8 dl/g.

The proportion of polyester ($a_1$) in component A is from 50 to 80, preferably from 50 to 75, in particular from 50 to 70%, by weight, based on the total weight of components ($a_1$)+($a_2$)+($a_3$).

The graft polymer ($a_2$), which accounts for from 10 to 25, in particular from 12 to 25, particularly preferably from 12 to 20%, by weight of component A is built up from
- ($a_{21}$) from 50 to 90% by weight of a grafting base based on
  - ($a_{211}$) from 95 to 99.9% by weight of a $C_2$–$C_{10}$-alkyl acrylate and
  - ($a_{212}$) from 0.1 to 5% by weight of a difunctional monomer having two olefinic, non-conjugated double bonds and (a₂₂) from 10 to 50% by weight of a graft surface comprising (a₂₂₁) from 5 to 50% by weight of a first sheath of styrene or substituted styrene of the general formula

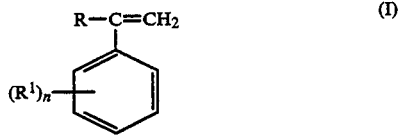

where R is alkyl of from 1 to 8 carbon atoms, hydrogen or halogen R' is alkyl of from 1 to 8 carbon atoms or halogen and n is 0, 1, 2, or 3, or a mixture thereof and (a₂₂₂) from 50 to 95% by weight of a second graft sheath of (a₂₂₂₁) from 80 to 100% by weight of methacrylic acid or an ester thereof whose polymer would, in the absence of (a₂₁) have a glass transition temperature of more than 40° C. and (a₂₂₂₂) from 0 to 20% by weight of further comonomers.

Component (a₂₁) is an elastomer having a glass transition temperature of below −20° C., in particular below −30° C.

To prepare the elastomer, the main monomer (a₂₁₁) comprises an ester of acrylic acid of from 2 to 10 carbon atoms, in particular of from 4 to 8 carbon atoms. Particularly preferred monomers here are tert-, iso- and n-butyl acrylate and also 2-ethylhexyl acrylate, of which the last two are particularly preferred.

These esters of acrylic acid are used together with from 0.1 to 5, in particular from 1 to 4%, by weight, based on the total weight of a₂₁₁+a₂₁₂, of a polyfunctional monomer having at least two olefinic, nonconjugated double bonds. Of these, difunctional compounds, i.e. those having two non-conjugated double bonds, are preferred. Examples thereof are divinylbenzene, diallyl fumarate, diallyl phthalate, triallyl cyanurate, triallyl isocyanurate, tricyclodecenyl acrylate and dihydrocyclopentadienyl acrylate, of which the last two are particularly preferred.

Processes for preparing the grafting base (a₂₁) are known per se and described for example in DE-B-No. 1,260,135. Corresponding products are also commercially available.

A particularly advantageous option in some cases is the preparation by emulsion polymerization.

The exact polymerization conditions, in particular the type, the rate of metering and the amount of the emulsifier, are preferably chosen in such a way that the latex of the acrylic ester, which is at least partially crosslinked, has an average particle size (weight average $d_{50}$) within the range from about 200 to 700, in particular from 250 to 600, nm. Preferably, the latex has a narrow particle size distribution, i.e. the ratio $$Q = \frac{d_{90} - d_{10}}{d_{50}}$$

is preferably less than 0.5, in particular less than 0.35.

The proportion of grafting base (a₂₁) in graft polymer (a₂) is from 50 to 90, preferably from 55 to 85, in particular from 60 to 80%, by weight, based on the total weight of (a₂).

The grafting base (a₂₁) has been grafted with a first graft sheath (a₂₂₁) built up from styrene or substituted styrene of the general formula I

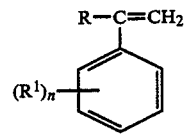

where R is alkyl of from 1 to 8 carbon atoms, hydrogen or halogen and R¹ is alkyl of from 1 to 8 carbon atoms or halogen, and n is 0, 1, 2 or 3.

The first graft sheath (a₂₂₁) accounts for from 5 to 50, preferably from 10 to 45, in particular from 15 to 40%, by weight of graft surface (a₂₂).

Examples of substituted styrenes are α-methylstyrene, p-methylstyrene, p-chlorostyrene and p-chloro-α-methylstyrene, of which styrene and α-methylstyrene are preferred.

The second graft sheath (a₂₂₂), which accounts for from 50 to 95, in particular from 55 to 90, and particularly preferably from 60 to 85%, by weight of component (a₂₂) is built up from (meth)acrylic acid and/or esters thereof whose polymers, in the absence of (a₂₁) would have a glass transition temperature of more than 40° C., in particular of more than 50° C., the second graft sheath being a rigid (thermoplastic) shell.

Preferred methacrylic esters (a₂₂₂₁) are those with $C_1$–$C_6$-alcohols and glycidyl methacrylate; particular preference is given to methyl methacrylate, t-butyl methacrylate, glycidyl methacrylate and methacrylic acid itself and also mixtures thereof.

Besides methacrylic esters it is in principle also possible to use acrylic acid derivatives as long as polymers thereof have a glass transition temperature (Tg) of more than 40° C. and/or the proportion thereof is not high enough for the second sheath as a whole not to have a Tg of more than 40° C.

Specific examples thereof are $C_1$–$C_6$-alkyl acrylates, in particular n-butyl acrylate.

Aside from (meth)acrylic acid and/or esters thereof it is also possible for up to 20% by weight of further copolymerizable monomers to be included in the second graft sheath. For more illustration there may be mentioned styrene and acrylonitrile. Preferably, however, no further monomers are present besides (a₂₂₂₁).

Graft sheath (a₂₂) may be prepared in the conventional manner described in the literature by first polymerizing the monomers which form the first graft sheath in the presence of components (a₂₁) and subsequently, in a second step, applying the outer (rigid) sheath (a₂₂₂).

By including polyfunctional monomers (such as monomers (a₂₁₁) it is also possible to crosslink the graft sheath.

Preferably, the graft sheath is prepared in emulsion as described for example in German Patent No. 1,260,135 and German Laid-Open Applications DOS Nos. 3,227,555, 3,149,357 and 3,414,118.

Depending on the conditions chosen, the graft copolymerization gives rise to a certain proportion of free copolymers of styrene or substituted styrene derivatives or (meth)acrylic acid and derivatives thereof.

The graft copolymer (a₂₁+a₂₂) has in general an average particle size of from 100 to 1,000 nm, in particular of from 200 to 700 nm ($d_{50}$ weight average). The conditions for preparing the elastomer ($a_{21}$) and for the grafting are therefore preferably chosen so as to produce particle sizes within this range. Measures to this end are known and described for example in German Pat. No. 1,260,135, German Laid-Open Application DOS No. 2,826,925 and J. Appl. Polym. Sci. 9 (1965), 2929–38. Enlarging the particle size of the latex of the elastomer may be accomplished for example by means of agglomeration.

For the purposes of the present invention the graft polymer $a_2$ also includes the free, non-grafted homopolymers and copolymers which form in the course of the graft copolymerization for preparing component ($a_{22}$).

In what follows, some preferred graft polymers are specified:

$a_2/1$: 60% by weight of grafting base ($a_{21}$) from
  ($a_{211}$) 98% by weight of n-butyl acrylate and
  ($a_{212}$) 2% by weight of dihydrodicyclopentadienyl acrylate and
  40% by weight of graft sheath ($a_{22}$) from
  25% by weight of styrene (1st graft sheath $a_{221}$) and
  75% by weight of methyl methacrylate (2nd graft sheath $a_{222}$)

$a_2/2$: grafting base as in the case of ($a_2/1$, together with
  5% by weight of a first graft sheath of styrene and
  35% by weight of a second graft stage ($a_{222}$) from
  85% by weight of methyl methacrylate and
  15% by weight of acrylonitrile $a_2/3$: grafting base as in the case of $a_2/1$, together with
  13% by weight of a first graft stage from styrene and
  27% by weight of a second graft stage from methyl methacrylate and n-butyl acrylate in a weight ratio of 90:10.

Component ($a_3$) in the molding compositions according to the invention comprises from 10 to 25, preferably from 12 to 20%, by weight of a copolymer of
  ($a_{31}$) from 50 to 90, preferably from 55 to 90, in particular from 65 to 80%, by weight of styrene and/or substituted styrene of the general formula I and
  ($a_{32}$) from 10 to 50, preferably from 10 to 45, in particular from 20 to 35%, by weight of acrylonitrile and/or methacrylonitrile.
  ($a_{33}$) from 0 to 10% by weight of a monomer having carboxyl, carboxyl derivative, hydroxyl or epoxy groups.

Products of this type may be prepared for example by the process described in German Published Applications DAS Nos. 1,001,001 and DAS No. 1,003,436. Such copolymers are also commercially available. Preferably, the weight average molecular weight determined by light scattering is within the range from 50,000 to 500,000, in particular from 100,000 to 250,000.

If monomers ($a_3$) are present, the proportion in component ($a_3$) is from 0.1 to 10, preferably from 0.2 to 10, in particular from 0.5 to 8%, by weight, based on the total weight of ($a_3$).

Examples of monomers ($a_{33}$) are glycidyl methacrylate, glycidyl acrylate, allyl glycidyl ether, vinyl glycidyl ether and glycidyl itaconate, and also acrylic acid, methacrylic acid and their metal salts, in particular alkali metal and ammonium salts, tertiary esters of acrylic acid and methacrylic acid, maleic acid, maleic anhydride, metal salts of the acid monoethyl ester of maleic acid, fumaric acid, monoethyl fumarate, itaconic acid, vinylbenzoic acid, vinylphthalic acid, salts of monoethyl fumarate, monoesters of maleic acid, fumaric acid and itaconic acid with alcohols ROH where R has up to 29 carbon atoms, e.g. methyl, propyl, iso-propyl, butyl, isobutyl, hexyl, cyclohexyl, octyl, 2-ethylhexyl, decyl, stearyl, methoxyethyl, ethoxyethyl and hydroxyethyl.

Although maleic anhydride and metal salts (in particular alkali metal and alkaline earth metal salts) of polymerizable carboxylic acids have no free carboxyl groups, they behave so similarly to the free acids that, for the purposes of the present invention, they shall be encompassed here under the generic term carboxyl-containing monomers.

A second group of suitable monomers ($a_{223}$) are monomers containing lactam groups.

They contain a lactam group of the general formula

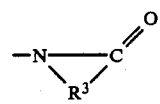

where $R^3$ is a branched or linear alkylene of from 2 to 15 carbon atoms.

Merely representative examples thereof are β-propiolactams (azetidin-2-ones) of the general formula

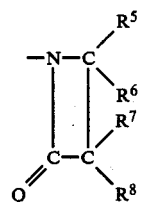

where the substitutents $R^5$ to $R^8$ may each be alkyl of from 1 to 6 carbon atoms or hydrogen. They are described by R. Graf in Angew. Chem. 74 (1962), 523–530, and H. Bastian in Angew. Chem. 80 (1968), 304–312. Examples thereof are 3,3'-dimethyl-3-propiolactam, 2-pyrrolidone

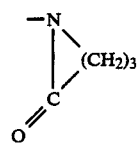

ecaprolactam

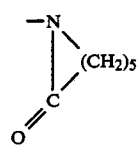

7-enantholactam, 8-capryllactam and 12-laurolactam, as also described by H. Dachs, Angew. Chemie 74 (1962), 540–45.

Of these, 2-pyrrolidones and -caprolactams are particularly preferred.

Preferably, the lactam groups as in

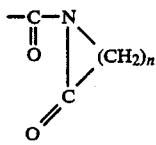

are incorporated into the corresponding monomers via a carbonyl group on the nitrogen.

A particularly preferred example thereof is N-(meth)acryloyl-ε-caprolactam

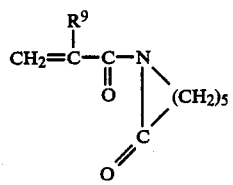

where $R^9$ is hydrogen or methyl.

Preferred monomers ($a_{33}$) are glycidyl esters of acrylic acid and methacrylic acid, maleic anhydride, tert-butyl acrylate, fumaric acid and maleic acid.

The weight ratio ($a_2$:$a_3$ is within the range from 1:2.5 to 2.5:1, preferably from 1:2 to 2:1, in particular from 1:1.5 to 1.5:1.

Component (B) in the molding compositions according to the invention comprises from 5 to 50, in particular from 7 to 45, particularly preferably from 8 to 40%, by weight, based on the total weight of the molding composition, of glass fibers. They are commercially available products.

In the molding composition, these glass fibers generally have an average length of from 0.1 to 0.5 mm, preferably from 0.1 to 0.4 mm, and a diameter within the range from 6 to 20 μm. Particular preference is given to glass fibers made of E-glass. To obtain better adhesion, the glass fibers may have been coated with organosilanes, epoxysilanes or other polymer coatings.

Aside from components (A) and (B), the molding compositions according to the invention may contain customary additives and processing aids.

Customary additives are for example stabilizers and oxidation retarders, agents against thermal decomposition and decomposition by ultraviolet light, lubricants and mold release agents, colorants, such as dyes and pigments, pulverulent fillers and reinforcing agents and plasticizers. Such additives are used in the customary active amounts.

The stabilizers may be added to the thermoplastic compositions at any stage of processing. Preferably, the stabilizers are added early on in order to prevent the onset of decomposition before the composition has been protected. Such stabilizers have to be compatible with the composition.

The oxidation retarders and heat stabilizers which may be added to the thermoplastic compositions according to the invention include those which are generally added to polymers, such as halides of metals of group I of the periodic table, e.g. sodium halides, potassium halides or lithium halides in conjunction with copper(I) halides, for example chloride, bromide or iodide. Further suitable stabilizers are sterically hindered phenols, hydroquinones, various substituted representatives of this group and combinations thereof in concentrations of up to 1% by weight, based on the weight of the mixture.

Suitable UV stabilizers are likewise those which are generally added to polymers in amounts of up to 2.0% by weight, based on the total weight of the mixture. Examples of UV stabilizers are various substituted resorcinols, salicylates, benzotriazoles, benzophenones and the like.

Suitable lubricants and mold release agents, added for example in amounts of up to 1% by weight to the thermoplastic composition, are stearic acids, stearyl alcohol, stearic esters and stearic amides.

It is also possible to add organic dyes such as nigrosine, pigments, for example titanium dioxide, cadmium sulfide, cadmium sulfide/selenide, phthalocyanines, ultramarine blue and carbon black.

It is also possible to employ nucleating agents, such as talc, calcium fluoride, sodium phenylphosphinate aluminum oxide or finely divided polytetrafluoroethylene, in amounts of for example up to 5% by weight, based on the composition. Plasticizers, such as dioctyl phthalate, dibenzyl phthalate, butyl benzyl phthalate, hydrocarbon oils, N-(n-butyl)benzenesulfonamide, o- and p-tolueneethylsulfonamide, are advantageously added in amounts of up to about 20% by weight, based on the molding composition. Colorants such as dyes and pigments may be added in amounts of up to about 5% by weight, based on the molding composition.

The thermoplastic molding compositions according to the invention can be prepared by mixing components $a_1$, ($a_2$ and ($a_3$, melting in an extruder, and adding the glass fibers via an inlet on the extruder. Such methods are known per se and described in the literature. The mixing temperatures in the extruder are in general within the range from 240° to 300° C. The molding compositions according to the invention are notable for good strength, high impact resistance and the particularly good surface structure of the moldings produced therefrom. In addition, an improvement in the long-term stability to water and heat compared with corresponding compositions without component B is achieved.

EXAMPLES 1 TO 10

The following components were used:

($a_1$) Polybutylene terephthalate having a viscosity number of 108 as measured in accordance with German Standard Specification DIN 53,728 Part 3

$a_2$/1 Graft polymer comprising
($a_{21}$) 60% by weight of a grafting base from
($a_{211}$) 98% by weight of n-butyl acrylate and
($a_{212}$) 2% by weight of dihydrodicyclopentadienyl acrylate,
($a_{221}$) 10% by weight of a first graft sheath of styrene and
($a_{222}$) 30% by weight of a second graft sheath of methyl methacrylate, prepared by the process described in German Laid-Open Application DOS 2,444,584.

$a_2$/2 Graft polymer comprising
($a_{21}$) 70% by weight of a grafting base from
($a_{211}$) 98% by weight of n-butyl acrylate and
($a_{212}$) 2% by weight of dihydrodicyclopentadienyl acrylate,
($a_{22}$) 30% by weight of a graft surface from
($a_{221}$) 33.3% by weight of a first sheath of styrene and
($a_{222}$) 66.7% by weight of a second sheath of ($a_{2222}$) 80% by weight of methyl methacrylate 15% by weight of n-butyl acrylate 2.5% by weight of butanediol diacrylate and 2.5% by weight of glycidyl methacrylate prepared in the same way as $a_2/1$.

For comparison, a graft polymer ($a_2/V$ was prepared with the following composition:
- ($a_{21}$) 60% by weight of a grafting base from
- ($a_{211}$) 98% by weight of n-butyl acrylate
- ($a_{212}$) 2% by weight of dihydrodicyclopentadienyl acrylate
- ($a_{22}$) 40% by weight of a graft surface from 75% by weight of styrene and 25% by weight of acrylonitrile, prepared by the process described in German Laid-Open Application DOS No. 2,444,584.

$a_3$ styrene/acrylonitrile copolymer of 65% by weight of styrene and 35% by weight of acrylonitrile having a viscosity number of 80, measured at 0.5% strength in dimethylformamide (DMF) at 25° C.

B glass fibers made of E-glass

Components $a_1$, $a_2$ and $a_3$ were mixed, melted in an extruder and admixed with glass fibers (B) added to the extruder. The extrusion temperature was 270° C. The compositions were then extruded into a water bath, granulated and dried. Thereafter, without further aftertreatment, test specimens were produced on an injection molding machine.

The mechanical and thermal properties were determined as follows:

| | |
|---|---|
| Modulus of elasticity | German Standard Specification DIN 53,457 |
| Impact strength $a_n$ | German Standard Specification DIN 53,453 (at 23° C.) |
| Notched impact strength | German Standard Specification DIN 53,453 (at 23° C.) |

The compositions and the results of the measurements are given in the table.

TABLE (all amounts in % by weight)

| Example | Composition $a_1$ | $a_2$ | $a_3$ | B | Modulus of elasticity N/mm | Impact strength kJ/m² | Notched impact strength kJ/m² |
|---|---|---|---|---|---|---|---|
| 1V | 49 | 11 $a_2/V$ | 10 | 30 | 9400 | 35 | 7.5 |
| 2V | 56 | 12 $a_2/V$ | 12 | 20 | 7200 | 32 | 8.0 |
| 3V | 42 | 14 $a_2/V$ | 14 | 30 | 9300 | 34 | 8.0 |
| 4 | 49 | 11 $a_2/1$ | 10 | 30 | 9300 | 39 | 8.5 |
| 5 | 49 | 11 $a_2/2$ | 10 | 30 | 9400 | 43 | 9.5 |
| 6 | 49 | 13 $a_2/2$ | 8 | 30 | 8600 | 47 | 12.0 |
| 7 | 56 | 12 $a_2/1$ | 12 | 20 | 7300 | 38 | 9.5 |
| 8 | 56 | 12 $a_2/2$ | 12 | 20 | 7400 | 40 | 11.0 |
| 9 | 42 | 14 $a_2/1$ | 14 | 20 | 7400 | 40 | 10.0 |
| 10 | 42 | 14 $a_2/2$ | 14 | 30 | 9300 | 43 | 12.5 |

V = Comparative test

We claim:

1. A thermoplastic molding composition consisting essentially of:
   (A) from 45 to 90% by weight, based on the total weight of components A and B, of a mixture of
      ($a_1$) from 50 to 90% by weight, based on the total weight of A, of a polyester and
      ($a_2$) from 10 to 25% by weight, based on the total weight of A, of a graft polymer consisting essentially of
         ($a_{21}$) from 50 to 90% by weight, based on the total weight of $a_2$, of a grafting base consisting essentially of
            ($a_{211}$) from 95 to 99.9% by weight, based on the total weight of $a_{21}$, of a $C_2$-$C_{10}$-alkyl acrylate and
            ($a_{212}$) from 0.01 to 5% by weight, based on the total weight of $a_{21}$, of a polyfunctional monomer having at least two olefinic, non-conjugated double bonds
         ($a_{22}$) from 10 to 50% by weight, based on the total weight of $a_2$, of a first graft surface consisting essentially of
            ($a_{221}$) from 5 to 50% by weight, based on the total weight of $a_{22}$, of styrene or substituted styrene of the general formula I $$R-C=CH_2 \quad (I)$$
$$(R^1)_n-\text{phenyl}$$

wherein R is alkyl of from 1 to 8 carbon atoms, hydrogen or halogen, $R^1$ is alkyl of from 1 to 8 carbon atoms or halogen, and n is 0, 1, 2 or 3, or a mixture thereof, and
            ($a_{222}$) from 50 to 95% by weight, based on the total weight of $a_{22}$, of a second graft sheath of methacrylic acid or an ester thereof whose polymer would, in the absence of $a_{21}$, have a glass transition temperature of more than 40° C. and
      ($a_3$) from 10 to 25% by weight, based on the total weight of A, of a copolymer of
         ($a_{31}$) from 50 to 90% by weight, based on the total weight of $a_3$, of styrene or substituted styrene of the general formula I or a mixture thereof and
         ($a_{32}$) from 10 to 50% by weight, based on the total weight of $a_3$, of acrylonitrile or methacrylonitrile or a mixture thereof, and
         ($a_{33}$) from 0 to 10% by weight, based on the total weight of $a_3$, of a monomer having carboxyl, carboxyl derivatives, hydroxyl or epoxy groups and
   (B) from 5 to 50% by weight, based on the total weight of A and B, of glass fibers.

* * * * *